United States Patent
Guyomard et al.

(10) Patent No.: US 8,313,138 B2
(45) Date of Patent: Nov. 20, 2012

(54) MOTOR VEHICLE FRONT FACE OF THE METAL/PLASTIC COMPOSITE TYPE

(75) Inventors: Jean-Nicolas Guyomard, Le Mesnil Fuguet (FR); Valérie Sandjivy, Issy-les-Moulineaux (FR); Jean-Louis Lanard, Feucherolles (FR)

(73) Assignee: Valeo Systemes Thermiques, Les Mesnil Saint Denis, Cedex (FR)

( * ) Notice: Subject to any disclaimer, the term of this patent is extended or adjusted under 35 U.S.C. 154(b) by 760 days.

(21) Appl. No.: 12/294,361

(22) PCT Filed: Mar. 13, 2007

(86) PCT No.: PCT/EP2007/052344
§ 371 (c)(1),
(2), (4) Date: Apr. 7, 2009

(87) PCT Pub. No.: WO2007/110321
PCT Pub. Date: Oct. 4, 2007

(65) Prior Publication Data
US 2009/0302642 A1  Dec. 10, 2009

(30) Foreign Application Priority Data
Mar. 24, 2006  (FR) ..................... 06 02614

(51) Int. Cl.
*B60R 13/02* (2006.01)
*B29C 43/10* (2006.01)

(52) U.S. Cl. ................. 296/193.09; 264/570
(58) Field of Classification Search ........... 296/193.09, 296/193.1, 187.09, 901.01, 203.02; 264/570
See application file for complete search history.

(56) References Cited

U.S. PATENT DOCUMENTS

| 6,273,496 B1 | 8/2001 | Guyomard et al. |
| 2005/0252704 A1 | 11/2005 | Kim |
| 2008/0038576 A1* | 2/2008 | Riviere et al. ............. 428/586 |

FOREIGN PATENT DOCUMENTS

| EP | 0658470 A1 | 6/1995 |
| EP | 1627800 A2 | 2/2006 |
| WO | WO 2004056610 A2 | 7/2004 |

OTHER PUBLICATIONS

English language abstract for EP 0658470 extracted from espacenet.com, dated Feb. 27, 2009.
English language abstract for EP 1627800 extracted from espacenet.com, dated Feb. 27, 2009.
PCT International Search Report for PCT/EP2007/052344, dated Jun. 21, 2007, 3 pages.

* cited by examiner

*Primary Examiner* — Joseph Pape
(74) *Attorney, Agent, or Firm* — Howard & Howard Attorneys PLLC

(57) ABSTRACT

A motor vehicle front face of the metal/plastic composite type, comprising at least one metal insert (16) over which a first plastic part (32) is overmolded and at least one metal element (20) produced by hydroforming over which a second plastic part (22) is overmolded.

12 Claims, 2 Drawing Sheets

MOTOR VEHICLE FRONT FACE OF THE METAL/PLASTIC COMPOSITE TYPE

RELATED APPLICATIONS

This application claims priority to and all the advantages of International Patent Application No. PCT/EP2007/052344, filed on Mar. 13, 2007, which claims priority to French Patent Application No. FR 06/02614, filed on Mar. 24, 2006.

CROSS-REFERENCE TO RELATED APPLICATIONS

This application claims priority to and all the advantages of International Patent Application No. PCT/EP2007/052344, filed on Mar. 13, 2007, which claims priority to French Patent Application No. FR 06/02614, filed on Mar. 24, 2006.

BACKGROUND OF THE INVENTION

The invention relates to a motor vehicle front face of the metal/plastic composite type.

A front face module is a structural element capable of incorporating various items of vehicle equipment such as headlamps, turn indicators, horn, heat exchanger, motor-fan unit or complete cooling module, etc. This module, thus fitted with its equipment, constitutes a prepared individual element delivered by the equipment manufacture and ready for the motor vehicle manufacturer to fit onto the vehicle.

This individual module is fitted by connecting it to lateral structural elements of the vehicle such as side rails, wings or shells, then by fitting a bumper or front valance attached to the module. A front face such as this is generally produced in the form of a one-piece element, particularly in the form of a metal/plastic composite element.

It is known practice, particularly from publication EP-A-0 658 470, to produce a front face in the form of a metal skeleton made of pressed sheet metal over which a plastic, particularly of the polyamide type, is overmolded. It is also known practice for a bumper beam, which contributes towards protecting the components of the module in the event of a front impact, to be associated with the front face.

It is also known practice for a front face to be produced in the form of a metal tube created by hydroforming, over which a plastic is overmolded, this in particular being performed using hydroplast technology (hydroplast being a trade name of General Electric).

The design of a front face is generally based on an analysis of the loadings that the various parts that make up the front face are liable to experience.

The pressed sheet metal skeleton technology offers the greatest simplicity but is of limited rigidity. Hydroformed tube technology offers better performance, but at a greater weight and higher cost.

SUMMARY OF THE INVENTION

The invention sets out to improve the situation.

To this end, the invention proposes a motor vehicle front face of the metal/plastic composite type, which comprises at least one metal insert over which a first plastic part is overmolded and at least one metal element produced by hydroforming over which a second plastic part is overmolded. The first and second plastic parts may be overmolded simultaneously and/or using the same plastic.

A front face such as this is particularly advantageous because it allows the structure reinforcing technology to be tailored to suit the local requirements of a front face while at the same time optimizing weight and cost considerations.

In this front face, the insert and the hydroformed element may be connected at their ends by connecting means which may be created at the time of molding. The insert and the hydroformed element may each have a through-opening facing one another and the connecting means may have a corresponding through-opening. A rigidifying element of the rivet or screw type made of metal or of plastic may be fitted through the opposing through-openings belonging to the insert, to the hydroformed element and to the connecting means.

Embodying the connecting means in this way allows use to be made of existing overmolding technology while at the same time providing a clean and firm joint the rigidity of which can be increased using the connecting means.

In one embodiment, the insert is a metal section piece extending over the entire width of the front face, and the hydroformed element may be a metal tube in the overall shape of a U the base of which forms a crossmember substantially parallel to the insert and the branches of which each form an upright. The ends of the branches of the U may be extended by branches for connecting to a structural element of the vehicle.

In another embodiment, the front face comprises two substantially parallel inserts in the form of metal section pieces, each forming an upright. It may also comprise two substantially parallel hydroformed tubes extending over the entire width of the front face, at the respective ends of the uprights.

The insert and the hydroformed element may be made of aluminum, aluminum alloy or steel.

The invention also relates to a method of manufacturing a motor vehicle front face, which involves the steps that consist in:

a. providing at least one metal insert, one element produced by hydroforming, and one mold for overmolding the plastic, b. providing a first mold element for overmolding a first plastic part onto the metal insert, and a second mold element for overmolding a second plastic part onto the hydroformed element, c. providing through-openings in the hydroformed element, at the intended point for connection to the first plastic part and at the ends of the hydroformed element, d. providing through-openings in the insert, these being substantially identical to those produced at the ends of the hydroformed element, e. placing the insert and the hydroformed element in the mold in such a way that the openings made in the insert face those made at the ends of the hydroformed element, with a pin belonging to the first mold element passing through these openings, f. overmolding the plastic while the insert and the hydroformed element are in position.

BRIEF SUMMARY OF THE SEVERAL VIEWS OF THE DRAWING(S)

Other advantages and features of the invention will become better apparent from reading the following description of some examples which are given by way of nonlimiting illustration and taken from the drawings in which.

DETAILED DESCRIPTION OF THE INVENTION

Figures 1, 2:
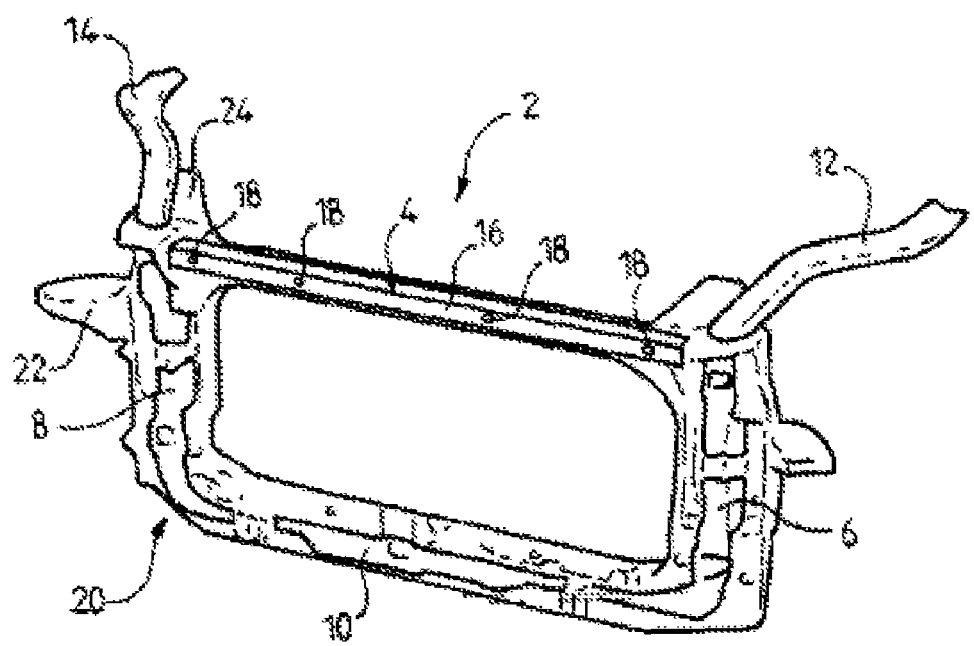
FIG. 1 shows a perspective view of a front face according to the invention.
FIG. 2 shows a detail of part of FIG. 1.

FIG. 1 depicts a front face 2 which comprises an upper crossmember 4 which run substantially horizontally across the entire width of the front face 2.

The front face 2 also comprises two uprights 6 and 8 which run substantially vertically at the ends of the crossmember 4, underneath the latter.

The front face 2 also comprises a lower crossmember 10 which runs between the uprights 6 and 8 substantially parallel to the crossmember 4. Branches 12 and 14 run in the continuation of the uprights 6 and 8 and can in particular be used to attach the front face 2 to a structural element of the vehicle.

The crossmember 4 is produced in the form of a metal section piece 16 or metal insert which in this instance is in the shape of a U the branches of which are substantially horizontal. Thus, when the front face 2 is mounted in the vehicle, the open part of the section piece 16 faces toward the rear of the vehicle. It might be possible to fit the section piece 16 differently.

Figure 3:
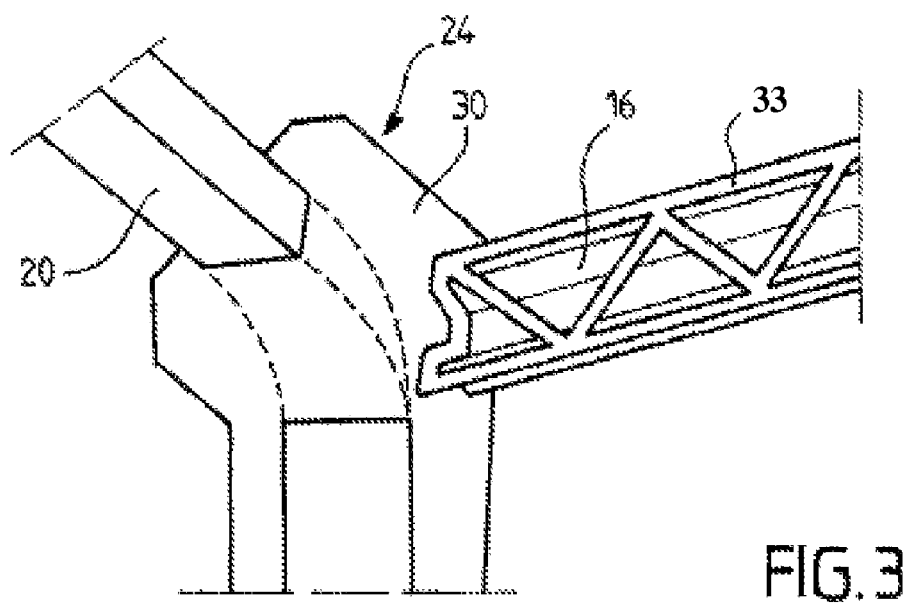
FIG. 3 shows a view of the detail of FIG. 2 from below and behind.

The section piece 16 has a plurality of openings 18 the purpose of which is to allow the overmolding of a plastic part better visible in FIG. 3. The crossmember 4 may be made of aluminum or of aluminum alloy or alternatively of steel, and the plastic used may for example be polyamide. This type of hybrid metal/plastic design using overmolding is known to those skilled in the art and in particular is described in patent EP-A-0 658 470.

The uprights 6 and 8, the lower crossmember 10 and the branches 12 and 14 all form part of one and the same tube 20 produced by hydroforming. The tube 20 has the overall shape of a U, the crossmember 10 forming its base and the upright 6 and 8 forming its branches. The branches of the U are extended by the branches 12 and 14.

The method of producing a tube by hydroforming is known to those skilled in the art. In general, this method consists in placing a hollow metal tube in a mold then in subjecting this tube to intense pressures using hydraulic pistons, so as to deform the tube until it corresponds to the shape of the mold. It is thus possible to start out with a hollow aluminum tube and end up with the shape depicted in FIG. 1.

The advantage of this technology is that it can be used to create a structure that is very rigid but, however, more expensive and heavier than the pressed section piece 16.

A plastic part 22 is shown in FIG. 1. This plastic part has been overmolded onto the tube 2 using a known method. This method in particular corresponds to the method known as the hydroplast method (hydroplast is a trade name of General Electric). In this method, openings are made in the tube 20 to allow the plastic part 22 to be overmolded, the mold sealing the tube 20 within these openings.

The insert 16 and the tube 20 are connected by connecting means 24 which will now be described using FIGS. 2 and 3.

As can be seen in FIG. 2, the section piece 16 has an opening 26 and the tube 20 has an opening 28. The insert 16 and the tube 20 are positioned relative to one another in such a way that the openings 26 and 28 are positioned substantially one on top of the other.

The connecting means 24 are produced in the form of a plastic part 30 which is overmolded around the connecting region of the section piece 16 and of the tube 20 and which leaves the openings 26 and 28 open to define an opening 32 in the connecting means.

The opening 32 may, in particular, be created by inserting a pin into the openings 26 and 28 while the plastic part 30 is being overmolded.

It is possible thereafter to insert a rigidifying element into the opening 32 in order to make the connection between the section piece 16 and the tube 20 firmer, this ridifying element being in the form of a rivet or a screw made of metal or of plastic.

FIG. 3 shows the part 30, from a different angle, viewed from behind and beneath. As can be seen in this figure, the part 30 completely surrounds the connecting region of the section piece 16 and of the tube 20. This figure also shows a plastic part 33 which is overmolded onto the section piece 16.

In general, one of the advantages of the invention is that it allows the plastic part 22, which covers the tube 20, the plastic part 30, and the plastic part 33 which covers the section piece 16, to be overmolded in one single overmolding operation. To do that, use may be made in particular of a two-part mold in which the two parts are designed to overmold the part 22, on the one hand, and the part 32, on the other, the portion connecting the two mold parts allowing the part 30 to be overmolded.

All of the parts 22, 30 and 32 may be overmolded using one single plastic—for example of the polyamide type—or these parts may be created using two different plastics.

Figure 4:
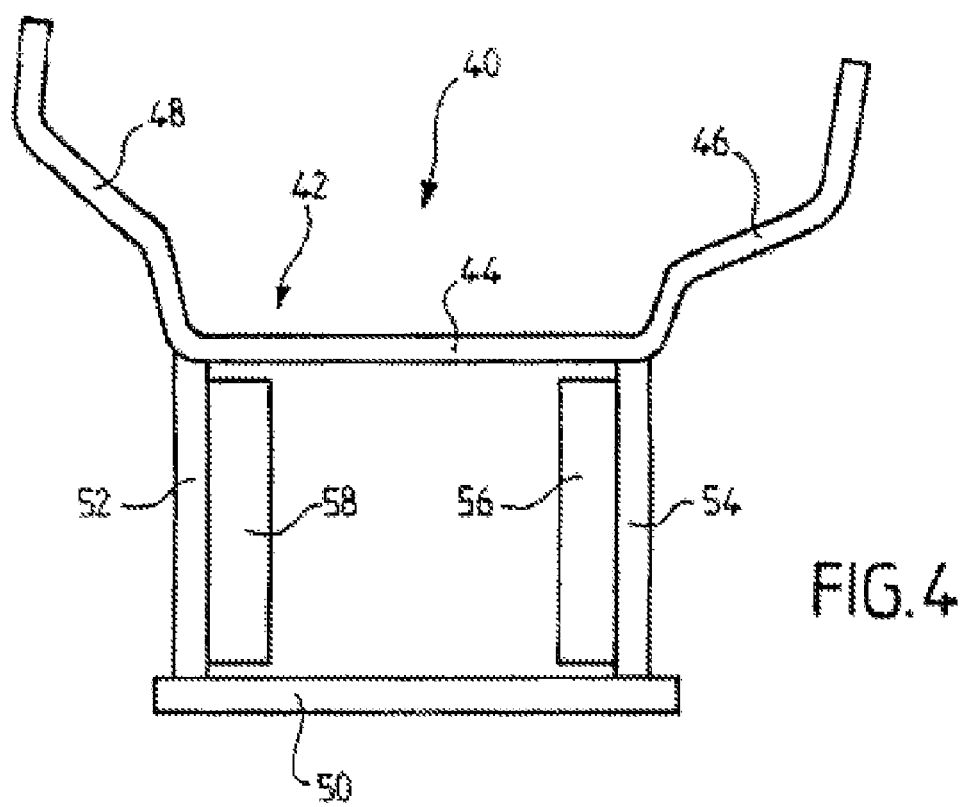
FIG. 4 shows an alternative form of embodiment of a front face according to the invention.

FIG. 4 depicts an alternative form of a front face 40. The front face 40 comprises a first metal tube 42, produced by hydroforming, which has a substantially horizontal part constituting a crossmember. The crossmember is extended at its ends by two branches 46 and 48 which run substantially toward the rear of the vehicle when the front face 44 is fitted thereinto, and which in particular provide the connection between the front face 40 and a structural element of the vehicle.

The front face 40 further comprises a second metal tube 50, also produced by hydroforming. The tube 50 constitutes a lower crossmember and is positioned parallel to the crossmember 44, in a lower part of the front face 40.

The front face 40 finally comprises two metal inserts 52 and 54 produced in the form of metal section pieces which are positioned substantially vertically between the ends of the crossmember 44 and of the crossmember 50, in order to constitute the uprights of the front face 40.

Finally, convergent nozzles 56 and 58 which were overmolded while the plastic was being overmolded onto the front face 40 can be used to guide the air to the cooler module once the front face 40 is in place on the vehicle.

The invention is not restricted to the embodiments described hereinabove and encompasses all alternative forms conceivable to a person skilled in the art, particularly upon reading the attached claims.

The invention claimed is:

1. A motor vehicle front face characterized in that the front face comprises at least one metal insert (16) over which a first plastic part (33) is overmolded and at least one metal element (20) produced by hydroforming over which a second plastic part (22) is overmolded, wherein the insert (16) and the hydroformed metal element (20) are connected at their ends by a connecting means (24) created by molding another plastic part (30), and wherein the insert (16) and the hydroformed metal element (20) each have a through-opening (26, 28) facing each other, and the connecting means (24) has a corresponding through-opening (32).

2. A front face according to claim 1, characterized in that the first (32) and second (22) plastic parts are overmolded simultaneously.

3. A front face according to claim 2, characterized in that the first (33) and second (22) plastic parts are overmolded using the same plastic.

4. A front face according to claim 1, characterized in that the first (32) and second (22) plastic parts are overmolded using the same plastic.

5. A front face according to claim 1, characterized in that the insert (16) is a metal section piece extending over the entire width of the front face.

6. A front face according to claim 1, characterized in that the hydroformed metal element (20) is a metal tube in the overall shape of a U, the base of which forms a crossmember (10) substantially parallel to the insert (16) and the branches of which each form an upright (6, 8).

7. A front face according to claim 6, characterized in that the ends of the branches of the U are extended by branches (12, 14) for connecting to the vehicle.

8. A front face according to claim 1, characterized in that the front face comprises two substantially parallel inserts (52, 54) each forming an upright.

9. A front face according to claim 1, characterized in that the front face comprises two substantially parallel hydroformed elements (42, 50) extending over the entire width of the front face, at the respective ends of the uprights (52, 54).

10. A front face according to claim 1, characterized in that the insert (16) and the hydroformed metal element (20) are made of aluminum, aluminum alloy or steel.

11. A front face according to claim 1, characterized in that the front face comprises two substantially parallel hydroformed elements (42, 50) extending over the entire width of the front face.

12. A method of manufacturing a motor vehicle front face, characterized in that the method involves the steps of:
   a. providing at least one metal insert (16) and one metal element (20) produced by hydroforming,
   b. providing a first mold element for overmolding a first plastic part (33) onto the metal insert (16), and a second mold element for overmolding a second plastic part (22) onto the hydroformed metal element (20),
   c. providing a through-opening (28) in the hydroformed metal element (20), at an intended point for connection to the first plastic part (33),
   d. providing a through-opening (26) in the metal insert (16), which is substantially identical to the through-opening (28) of the hydroformed metal element (20),
   e. placing the metal insert (16) and the hydroformed metal element (20) in a mold in such a way that the through-opening (26) made in the metal insert (16) face the through-opening (28) made in the hydroformed metal element (20), with a pin belonging to the first mold element passing through the through-openings (26, 28),
   f. overmolding the metal insert (16) and the hydroformed metal element (20) to create connection means (24) connecting the metal insert (16) and the hydroformed metal element (20) at their ends,
   g. providing a through-opening (32) in the connection means (24), which corresponds with the through-openings (26, 28) of the metal insert (16) and the hydroformed metal element (20).

* * * * *